(12) United States Patent
Ballard

(10) Patent No.: US 8,089,228 B2
(45) Date of Patent: Jan. 3, 2012

(54) COMPUTER ACTIVATED GAS CAP

(76) Inventor: Claudio R. Ballard, Fort Lauderdale, FL (US)

( * ) Notice: Subject to any disclaimer, the term of this patent is extended or adjusted under 35 U.S.C. 154(b) by 467 days.

(21) Appl. No.: 12/398,918

(22) Filed: Mar. 5, 2009

(65) Prior Publication Data

US 2009/0289062 A1 Nov. 26, 2009

Related U.S. Application Data

(60) Provisional application No. 61/034,949, filed on Mar. 7, 2008.

(51) Int. Cl.
*B60K 15/04* (2006.01)
*B65D 51/14* (2006.01)

(52) U.S. Cl. ........ 318/255; 318/266; 318/280; 318/466; 296/97.22; 141/312; 73/1.03

(58) Field of Classification Search .................. 318/255, 318/266, 280, 466; 296/97.22; 141/312; 73/1.03
See application file for complete search history.

(56) References Cited

U.S. PATENT DOCUMENTS

| | | | |
|---|---|---|---|
| 3,133,741 A | 5/1964 | Garabello | |
| 5,066,062 A | 11/1991 | Sekulovski | |
| 5,156,198 A | 10/1992 | Hall | |
| 5,348,706 A * | 9/1994 | Abul-Haj et al. | ............... 73/1.03 |
| 5,988,238 A | 11/1999 | Palvolgyi | |
| 6,234,555 B1 | 5/2001 | Emmerich et al. | |
| 6,234,557 B1 * | 5/2001 | Bae | ........................... 296/97.22 |
| 2009/0126827 A1 * | 5/2009 | Guendouz et al. | ............. 141/312 |

OTHER PUBLICATIONS

PCT: International Search Report of PCT/US09/36322 (related application); Jun. 11, 2009; 2 pgs.
PCT: Written Opinion of the International Searching Authority of PCT/US09/36322 (related application); Jun. 11, 2009; 6 pgs.

* cited by examiner

*Primary Examiner* — Paul Ip
(74) *Attorney, Agent, or Firm* — Howison & Arnott, L.L.P.

(57) ABSTRACT

An automated gas cap mechanism for opening and closing the fuel tank of a vehicle includes a housing with a filler compartment door mounted on a door support link that is coupled to an axle having first and second ends mounted in slots formed in the housing and configured to rotate and to move longitudinally in the housing. A crank is mounted on the axle and an arm on the crank is pivotally coupled to the door support link. A drive motor is operable to rotate the axle and crank to retract the filler compartment door into the housing and drive the axle in a linear direction to open a gas cap coupled to the axle.

20 Claims, 20 Drawing Sheets

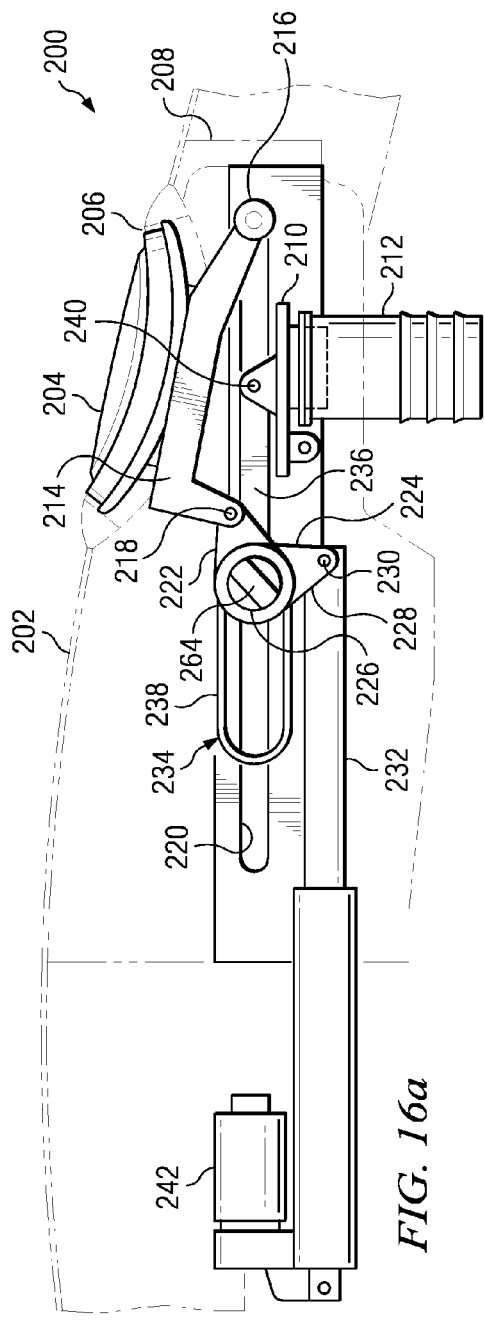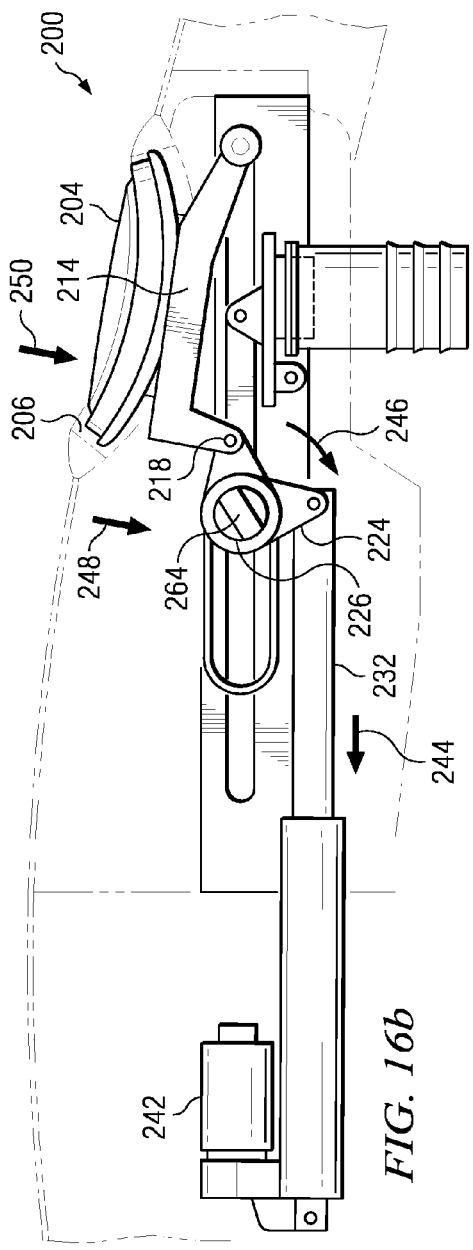
FIG. 16a
FIG. 16b

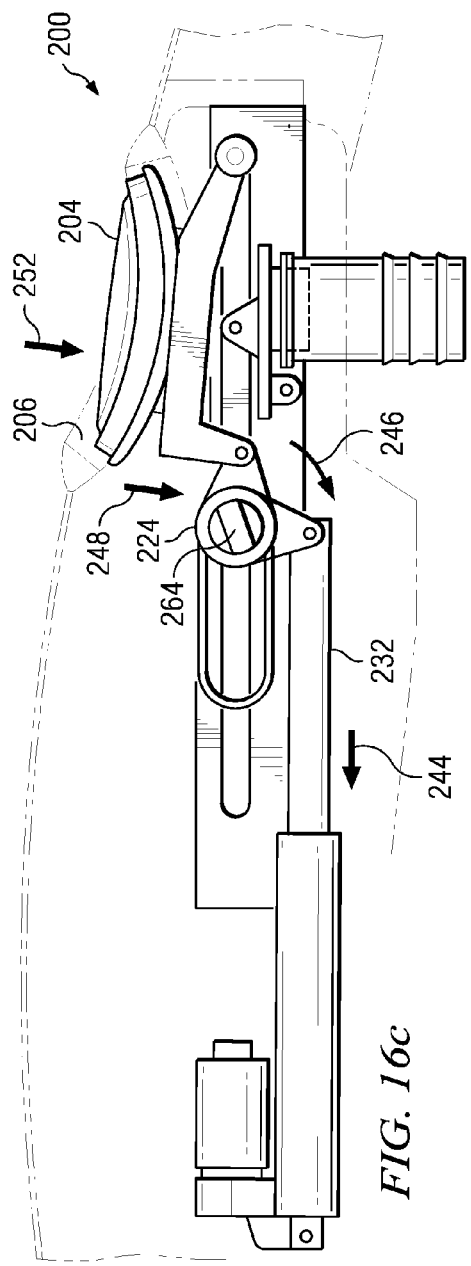
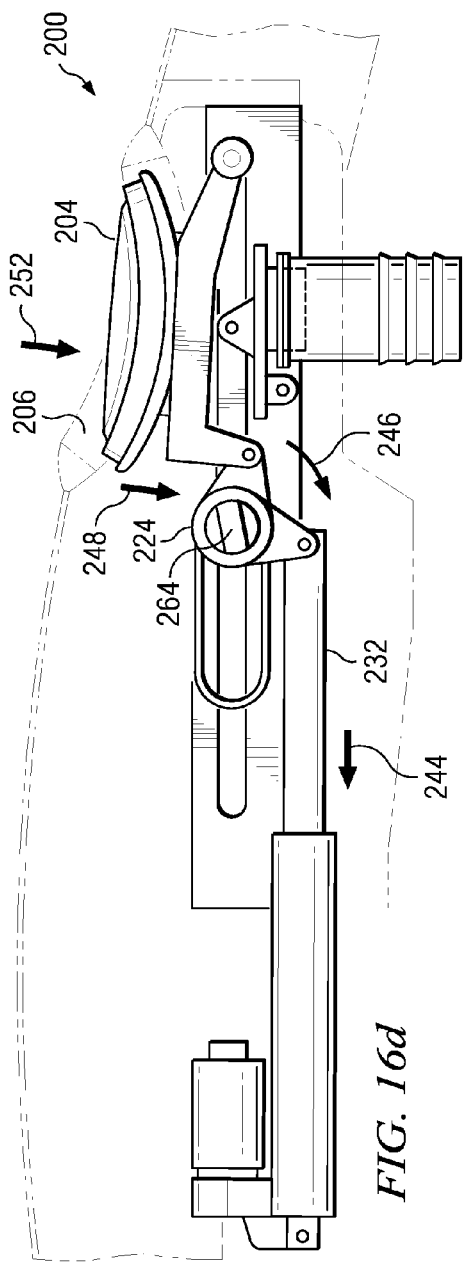
FIG. 16c
FIG. 16d

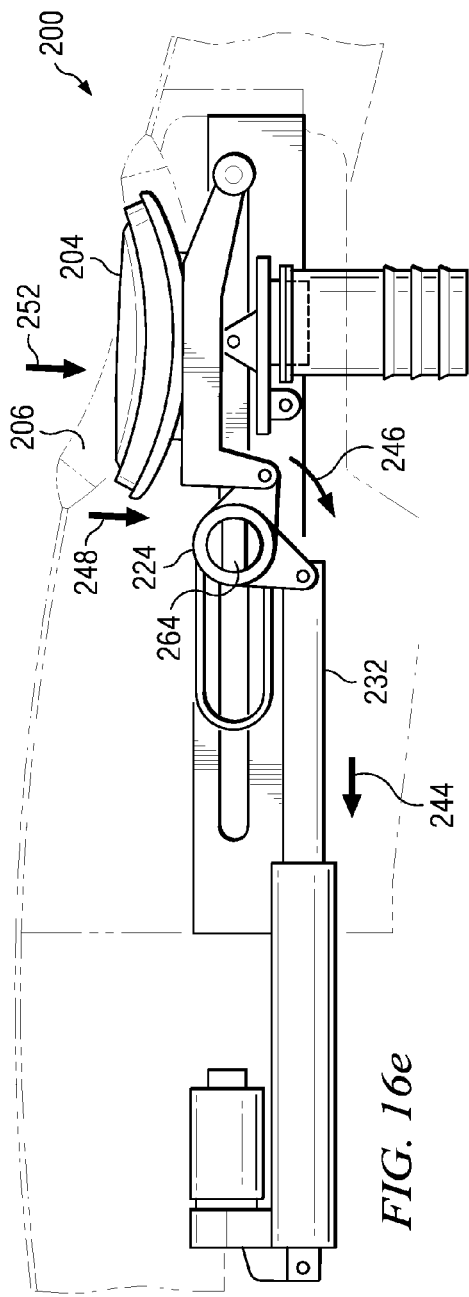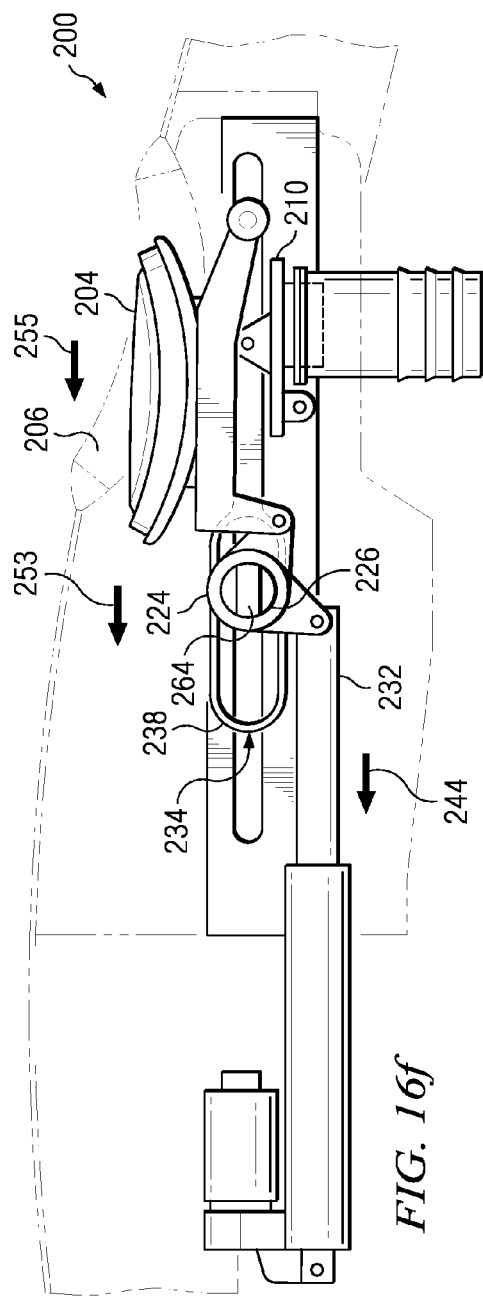

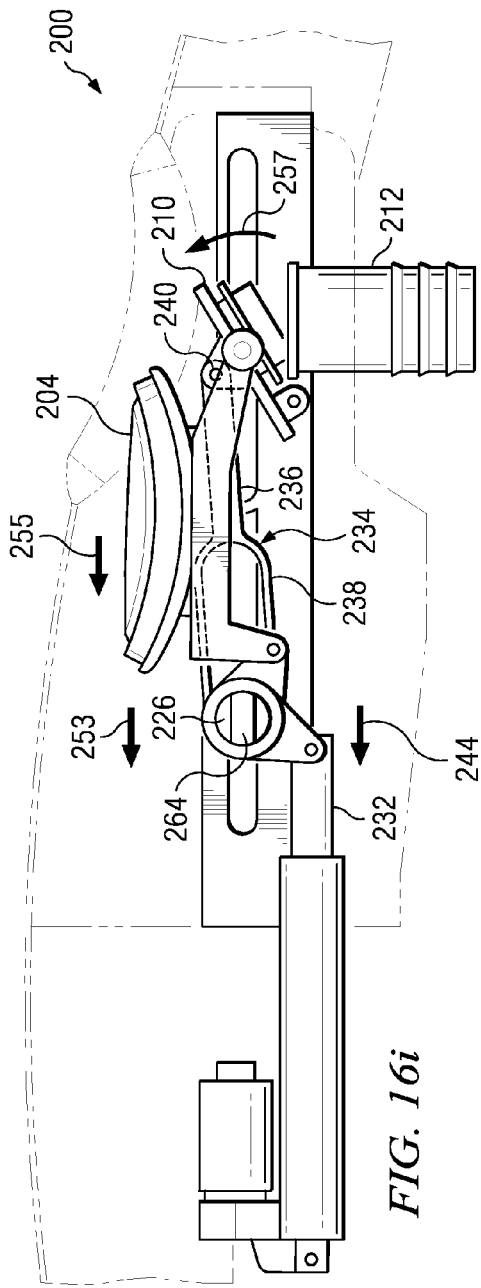
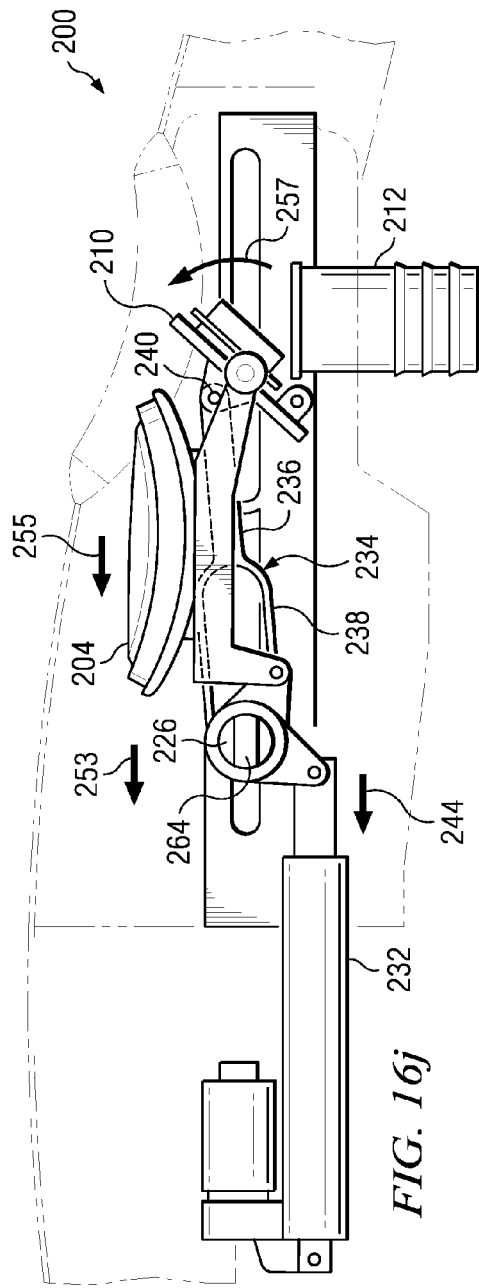
FIG. 16i
FIG. 16j

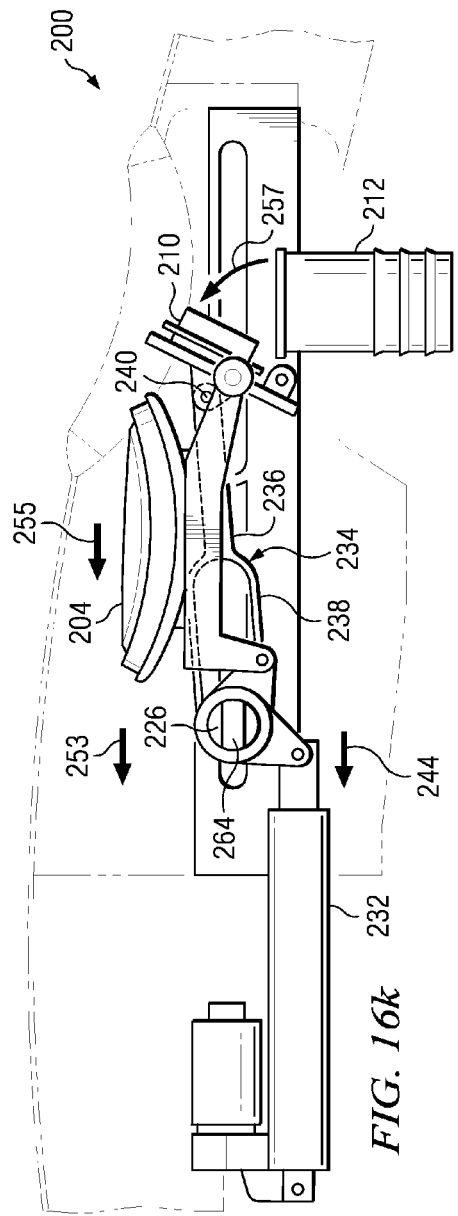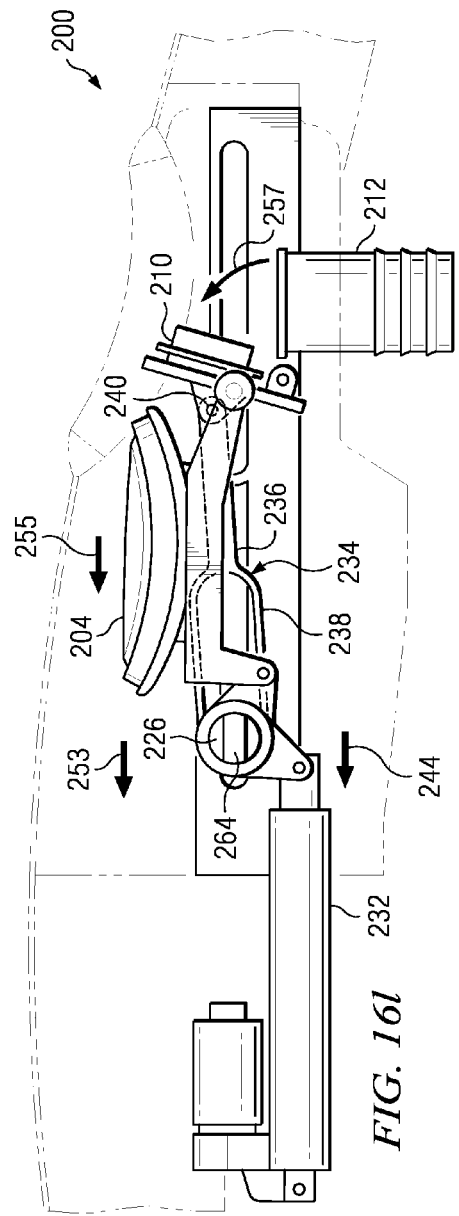

COMPUTER ACTIVATED GAS CAP

CROSS-REFERENCE TO RELATED APPLICATIONS

This application claims the benefit of U.S. Provisional Application for Patent Ser. No. 61/034,949, filed Mar. 7, 2008, and entitled COMPUTER ACTIVIATED GAS CAP, the specification of which is incorporated herein in its entirety by reference.

TECHNICAL FIELD

The following disclosure relates to fuel closure assemblies for vehicles, and in particular to a computer activated gas cap mechanism that automatically opens the door to the fuel filler compartment and the gas cap itself to allows "hands-free" refueling.

BACKGROUND

It is known to provide a remotely operated actuator that releases the door to the fuel filler compartment on an automobile. Once the compartment door is open, however, the user must manually remove the fuel filler cap (typically know as a "gas cap") from the fuel filler neck before refueling the vehicle. In many cases, the gas cap is tightly sealed (e.g., to meet emission control regulations) and can be difficult to remove. In addition, the gas cap may be dirty or contaminated with fuel due to previous spills. Thus, touching the gas cap often results in the transfer of dirt or toxic and malodorous fuel residue to the user's hands. A need therefore exists, for a gas cap mechanism that allows refueling without requiring the user to touch the gas cap.

Once refueling is complete, the user must manually replace the gas cap on the fuel filler neck. Again, considerable strength may be required to properly seal the vapor-control seals. In addition, the user is again exposed to possible contamination from spilled fuel on the cap. Further, if the user is distracted during the refueling operation, he/she may forget to replace the gas cap and/or close the fuel filler compartment door. An open fuel filler neck or fuel filler compartment presents a possible fire hazard, allows the release of toxic and flammable fuel vapors into the atmosphere, and may invite fuel theft. A need therefore exists for a gas cap mechanism that automatically seals the fuel filler neck and fuel filler compartment when refueling is completed without requiring manual intervention by the user.

SUMMARY

In one aspect, an automated gas cap mechanism for opening and closing the fuel tank of a vehicle includes a housing with a filler compartment door mounted in the housing. The filler compartment door is mounted on a door support link that is coupled to an axle mounted in the housing. The axle has first and second ends mounted in slots formed in the housing and is configured to rotate and to move longitudinally in the housing. A crank mounted on the axle includes an arm pivotally coupled to the door support link for opening and closing the filler compartment door. A gas cap is also connected to the axle as is a drive motor. The drive motor is operable to rotate the axle and crank to retract the filler compartment door into the housing and drive the axle in a linear direction to open the gas cap.

In one variation, the drive motor is coupled to the axle with a linear actuator connected to the second arm of the crank. In another variation, the mechanism of includes a pinion and rack for coupling the drive motor to the axle. In this embodiment, a least one drive gear is mounted on the axle to engage the rack to rotate the axle and move the axle in a linear direction.

In one variation, a loop member or link is provided for coupling the gas cap to the axle so that linear movement of the axle causes the gas cap to pivot open and closed. The crank maybe a split bell crank whereby the loop member is positioned on the axle between the two halves of the bell crank.

In another aspect, a computer actuated gas cap mechanism for opening and closing the fuel tank of a vehicle includes an onboard computer for controlling the operation of the mechanism and a drive motor for driving the mechanism. An axle is mounted in a housing for the mechanism, the axle including first and second ends positioned in slots formed in inside surfaces of the housing. The axle is coupled to the drive motor and configured to rotate and to move linearly along the slots. A filler compartment door is mounted on the housing on a door support link coupled to the drive motor. A bell crank mounted on the axle includes an arm pivotally connected to the door support link whereby actuation of the drive motor opens and closes the filler compartment door. A gas cap is coupled to the axle whereby the drive motor is operable to rotate the axle and bell crank to retract the filler compartment door into the housing and to drive the axle in a linear direction along the slots to open the gas cap.

In another embodiment, a computer actuated gas cap mechanism includes a drive motor for driving the mechanism. The drive motor may be mounted on the outside of a housing that has first and second opposed slots formed in inside surfaces of the housing. In one variation, the slots each have an enlarged section at an end of the slot with narrow portions extending from the enlarged portions. An axle mounted in the housing is coupled to the drive motor. The axle includes first and second end cams mounted in opposed ones of the slots such that the axle is configured to rotate when the end cams are positioned in the enlarged end portions of the slots and move in a linear direction when the end cams are positioned in the narrow portions of the slots.

A filler compartment door is mounted on the housing by means of a door support link coupled to the drive motor. The door support link is pivotally coupled to a bell crank mounted on the axle as is a gas cap. The drive motor is operable to rotate the axle and bell crank to retract the filler compartment door into the housing and to drive the axle in a linear direction along the slots to open the gas cap.

BRIEF DESCRIPTION OF THE DRAWINGS

For a more complete understanding, reference is now made to the following description taken in conjunction with the accompanying Drawings in which:

FIGS. 16a-16m are schematic cutaway views of an automatic gas cap mechanism in accordance with another embodiment illustrating the sequence of operation during the automatic opening of the filler compartment door and gas cap;

DETAILED DESCRIPTION

Figure 1:
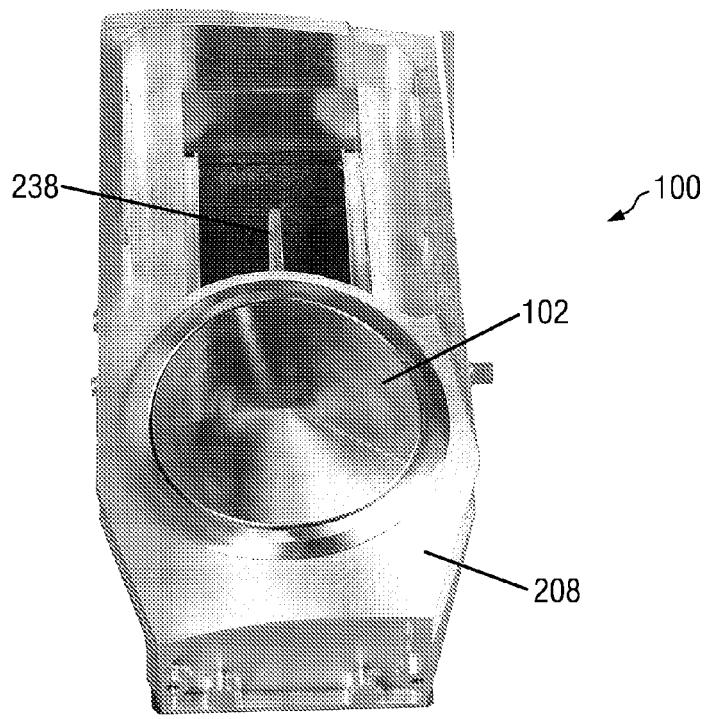
FIG. 1 is a front top perspective view of an automatic gas cap mechanism in accordance with a first embodiment (door closed position)
Figure 2:
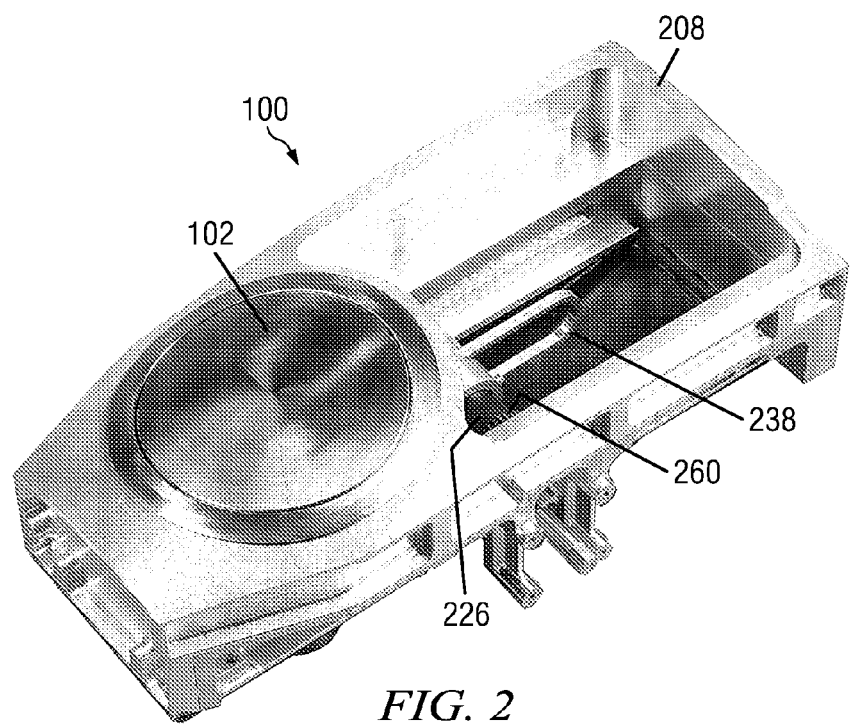
FIG. 2 is a left front quarter top perspective view of the mechanism of FIG. 1 (door closed position)
Figure 3:
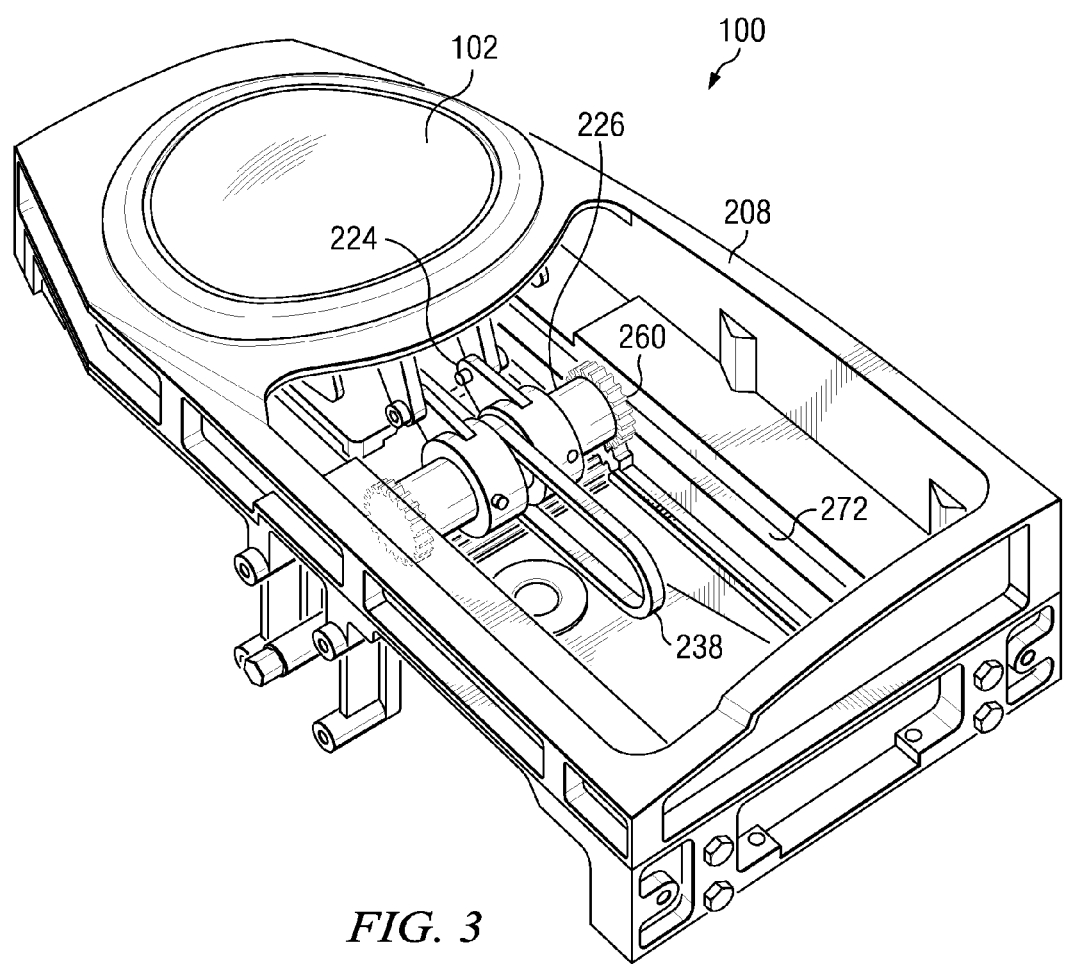
FIG. 3 is a left rear quarter top perspective view of the mechanism (door closed position)
Figure 4:
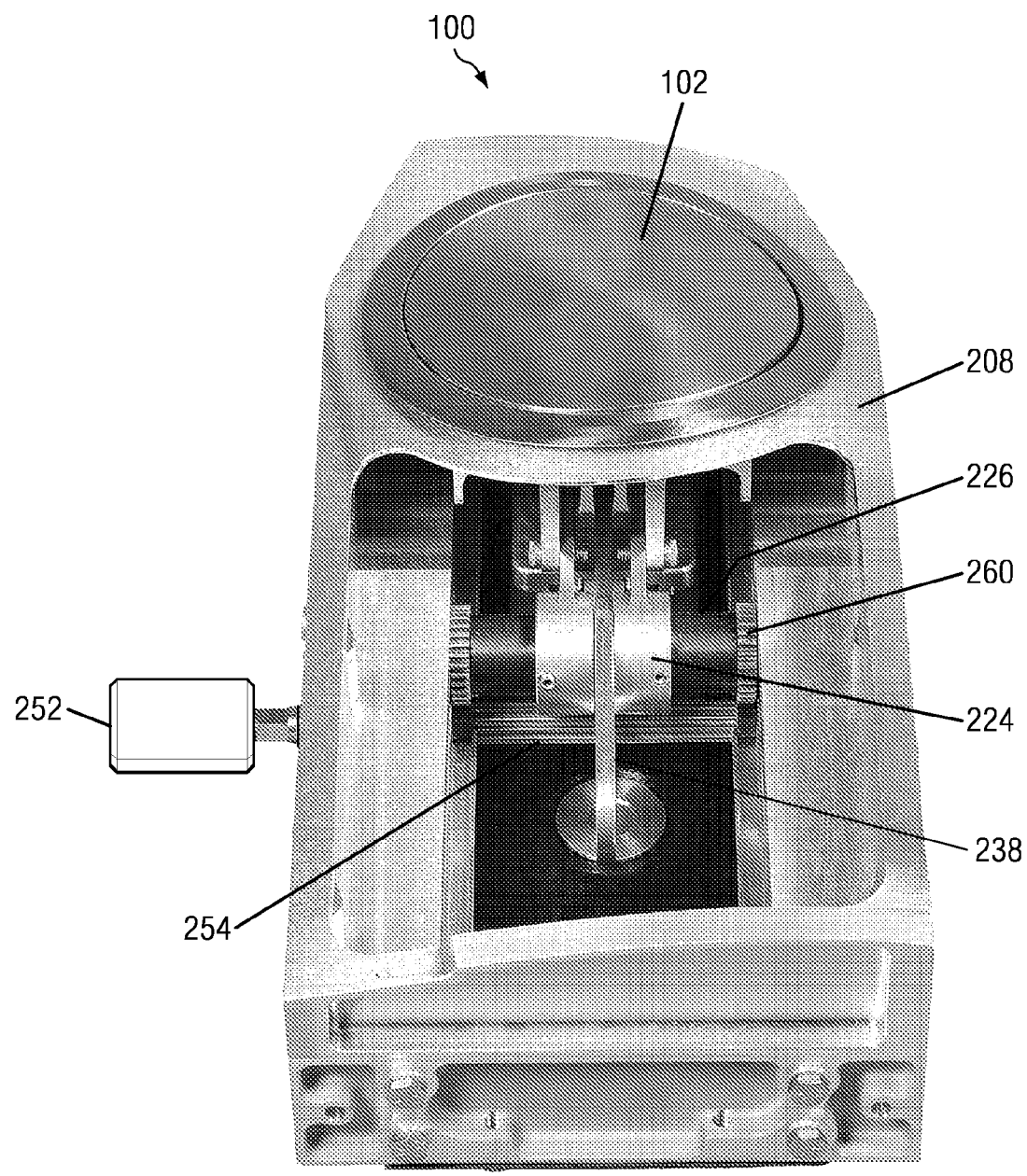
FIG. 4 is a rear top perspective view of the mechanism (door closed position)
Figure 5:
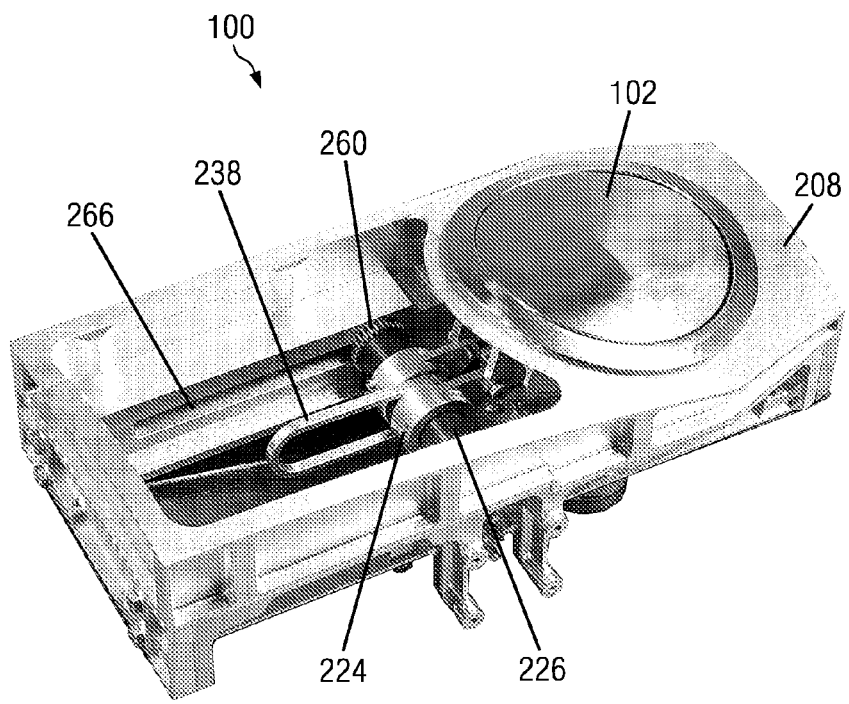
FIG. 5 is a right rear quarter top perspective view of the mechanism (door closed position)
Figure 6:
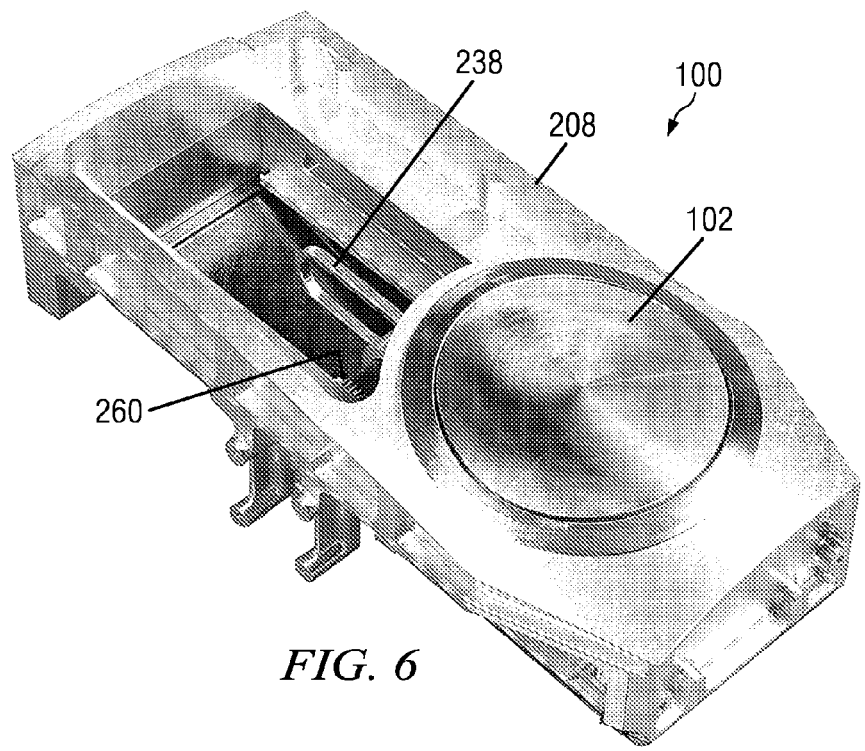
FIG. 6 is a right front quarter top perspective view of the mechanism (door closed position)
Figure 7:
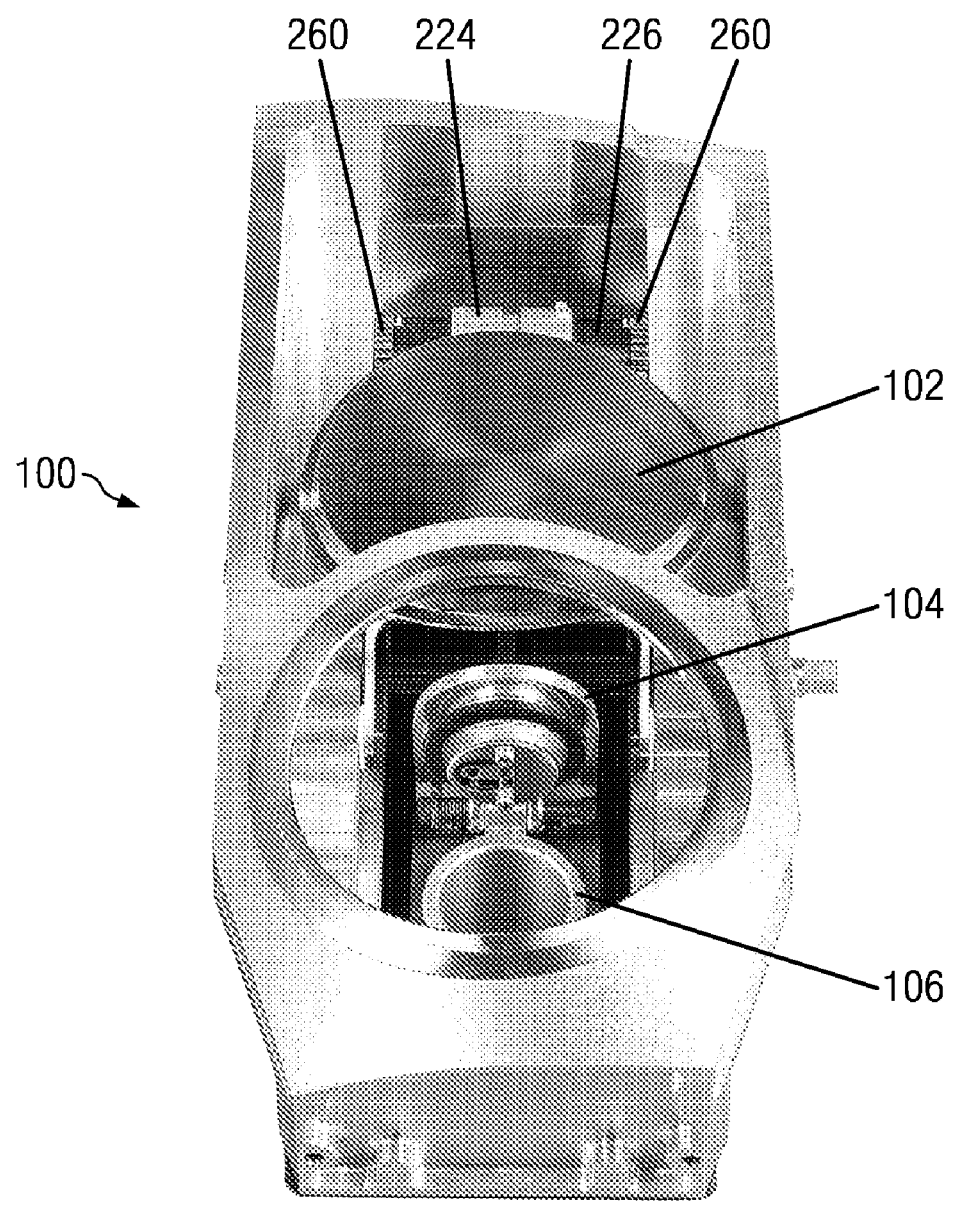
FIG. 7 is a front top perspective view of the mechanism of FIG. 1 (door open position)
Figure 8:
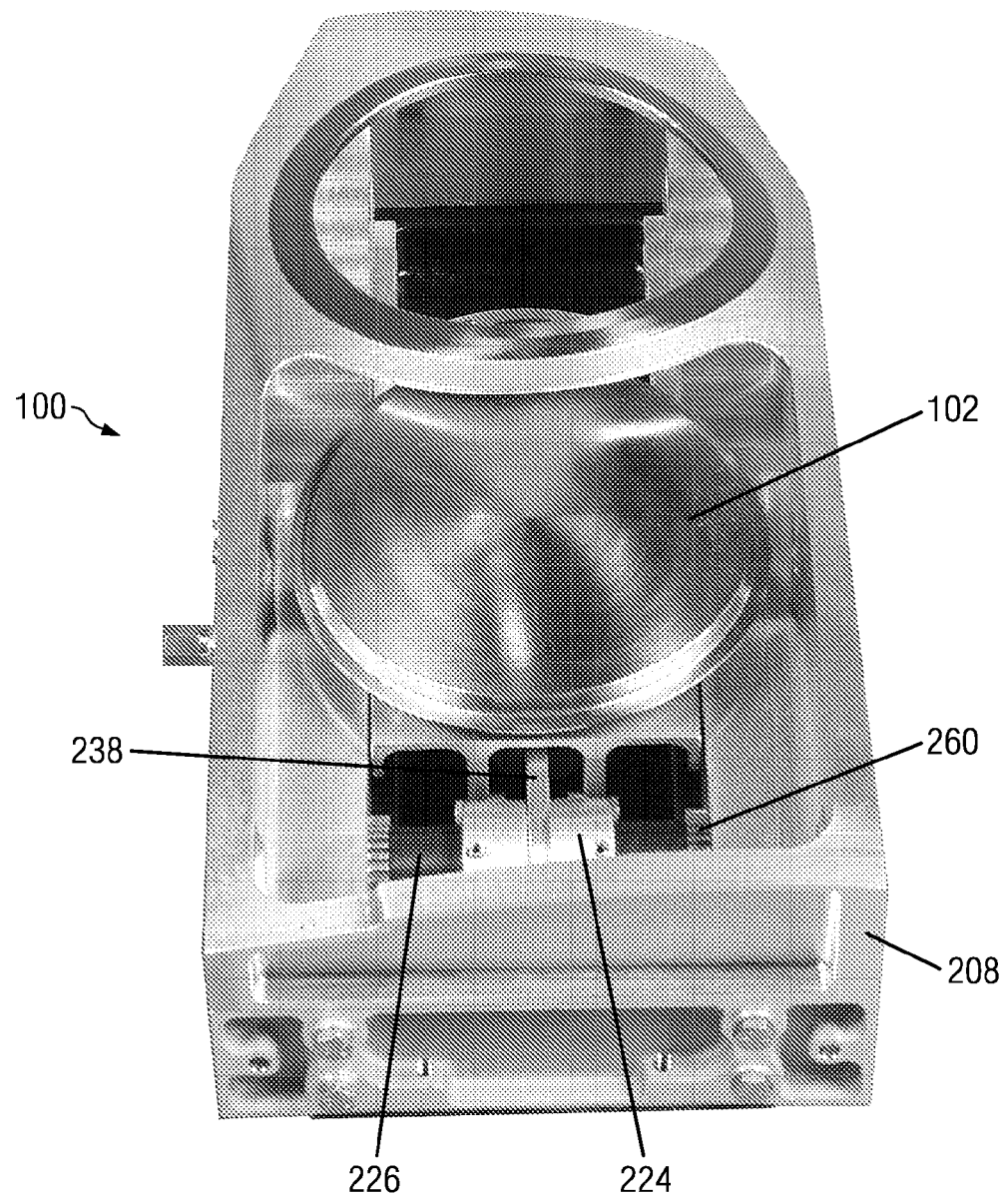
FIG. 8 is a rear perspective view of the mechanism (door open position)
Figure 9:
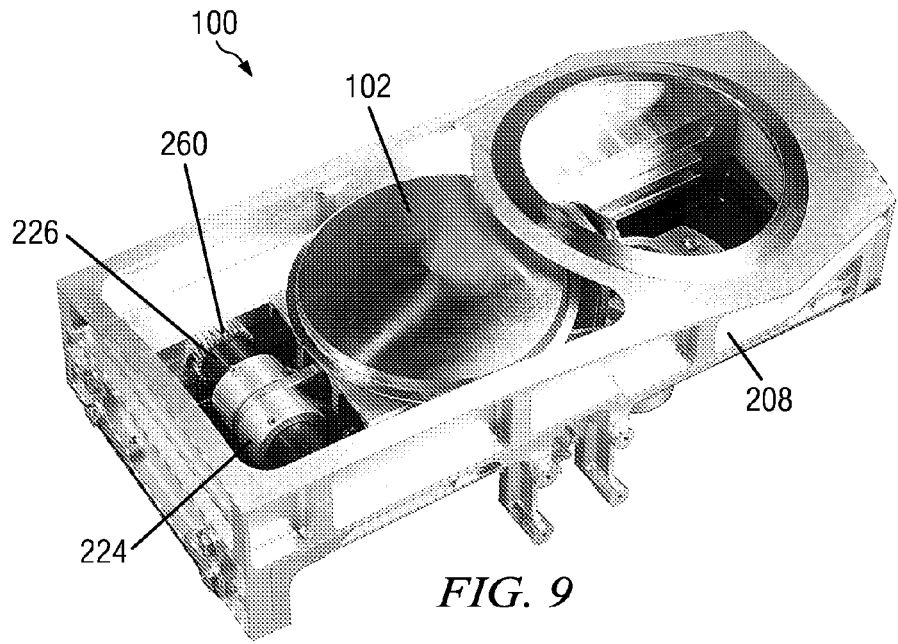
FIG. 9 is a right rear quarter top perspective view of the mechanism (door open position)
Figure 10:
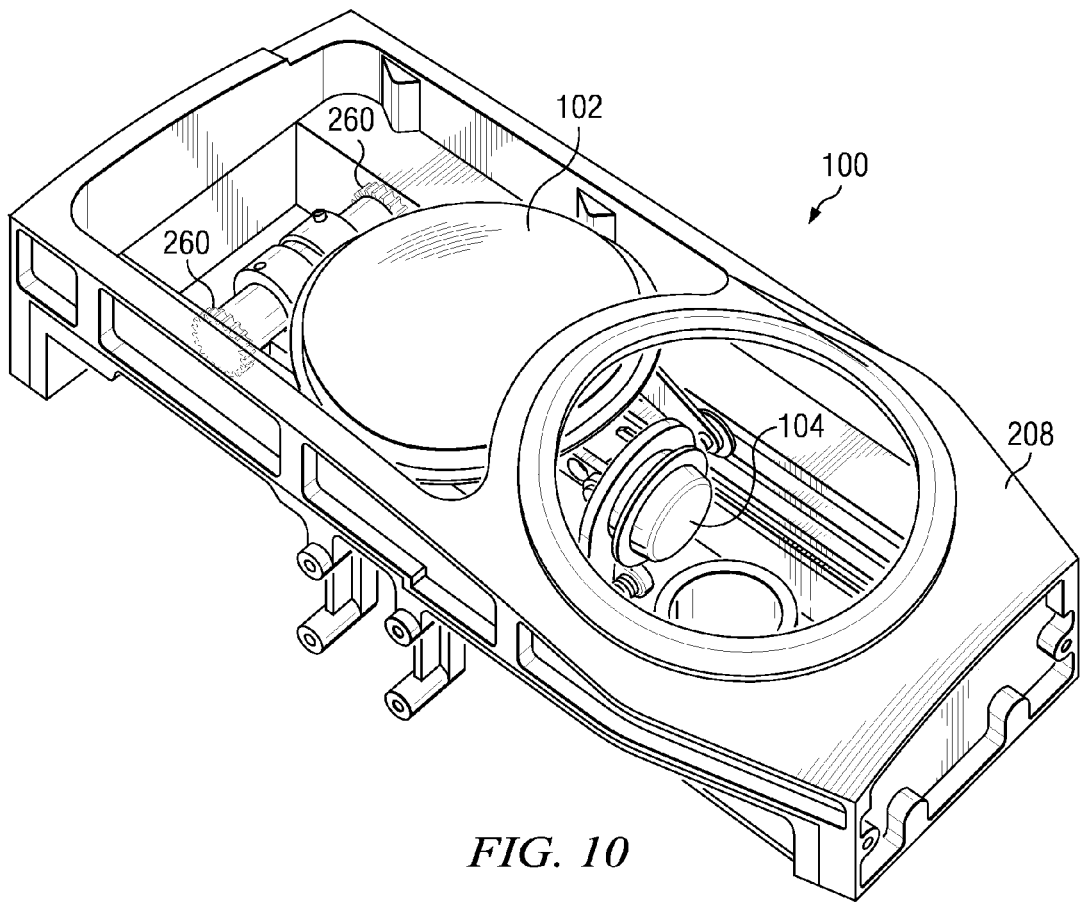
FIG. 10 is a right front quarter top perspective view of the mechanism (door open position)
Figure 11:
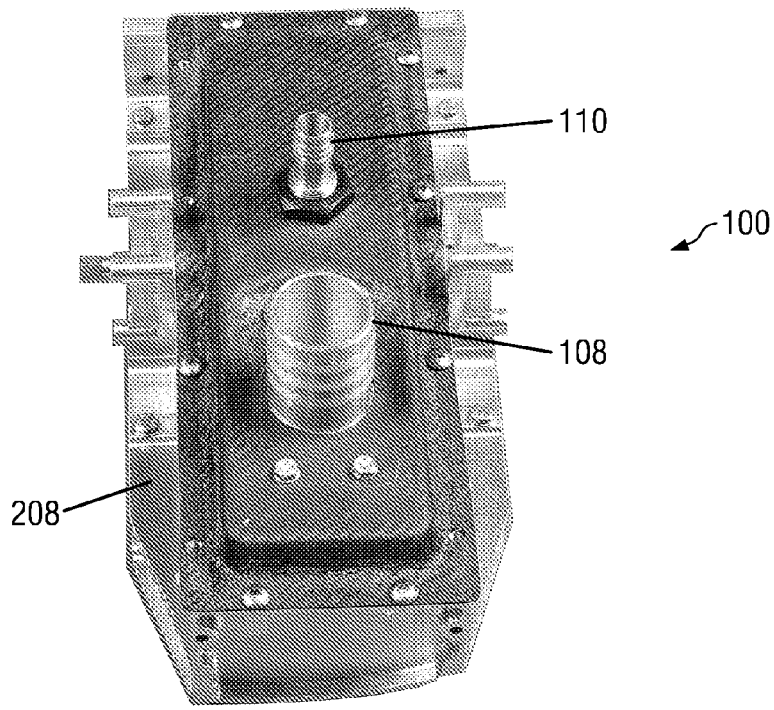
FIG. 11 is a front bottom perspective view of an automatic gas cap mechanism of FIG. 1.
Figure 12:
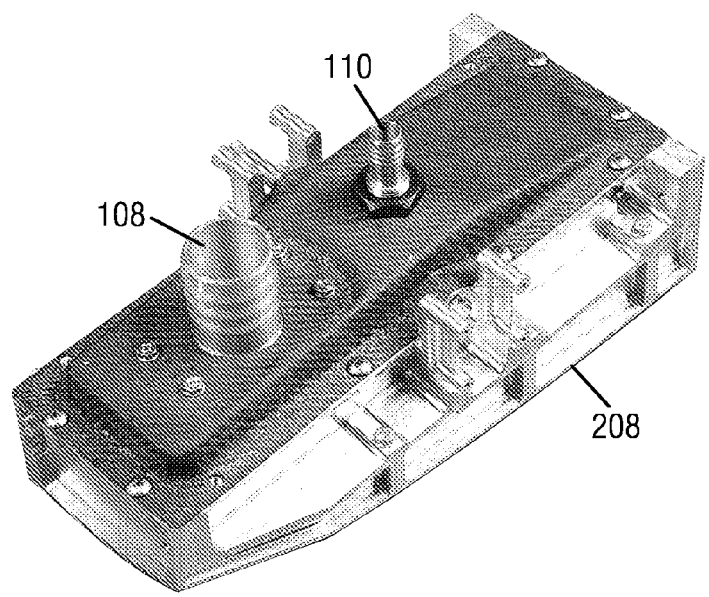
FIG. 12 is a right front quarter bottom perspective view of the mechanism.
Figure 13:
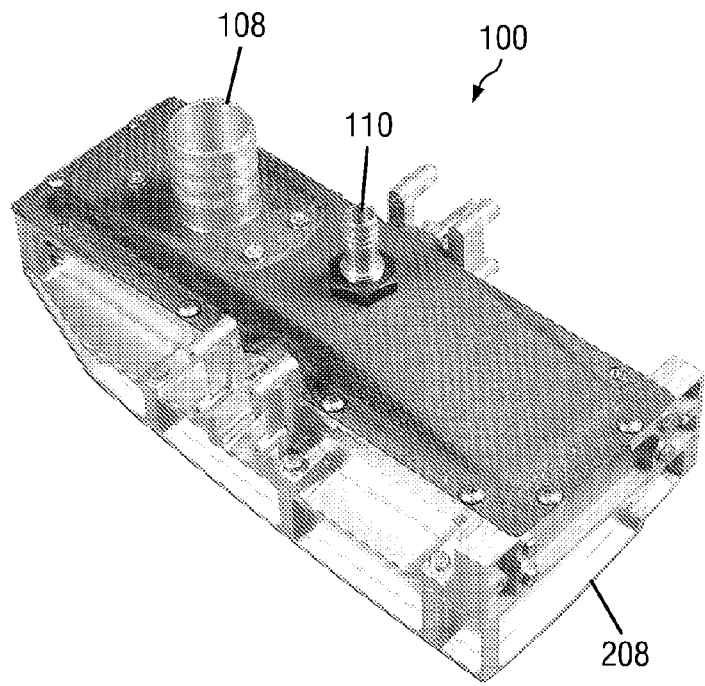
FIG. 13 is a right rear quarter bottom perspective view of the mechanism.
Figure 14:
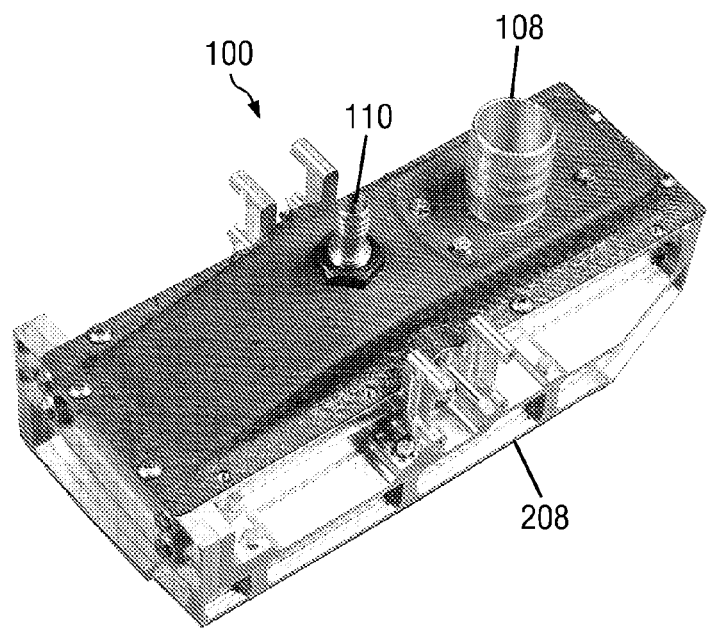
FIG. 14 is a left rear quarter bottom perspective view of the mechanism.
Figure 15:
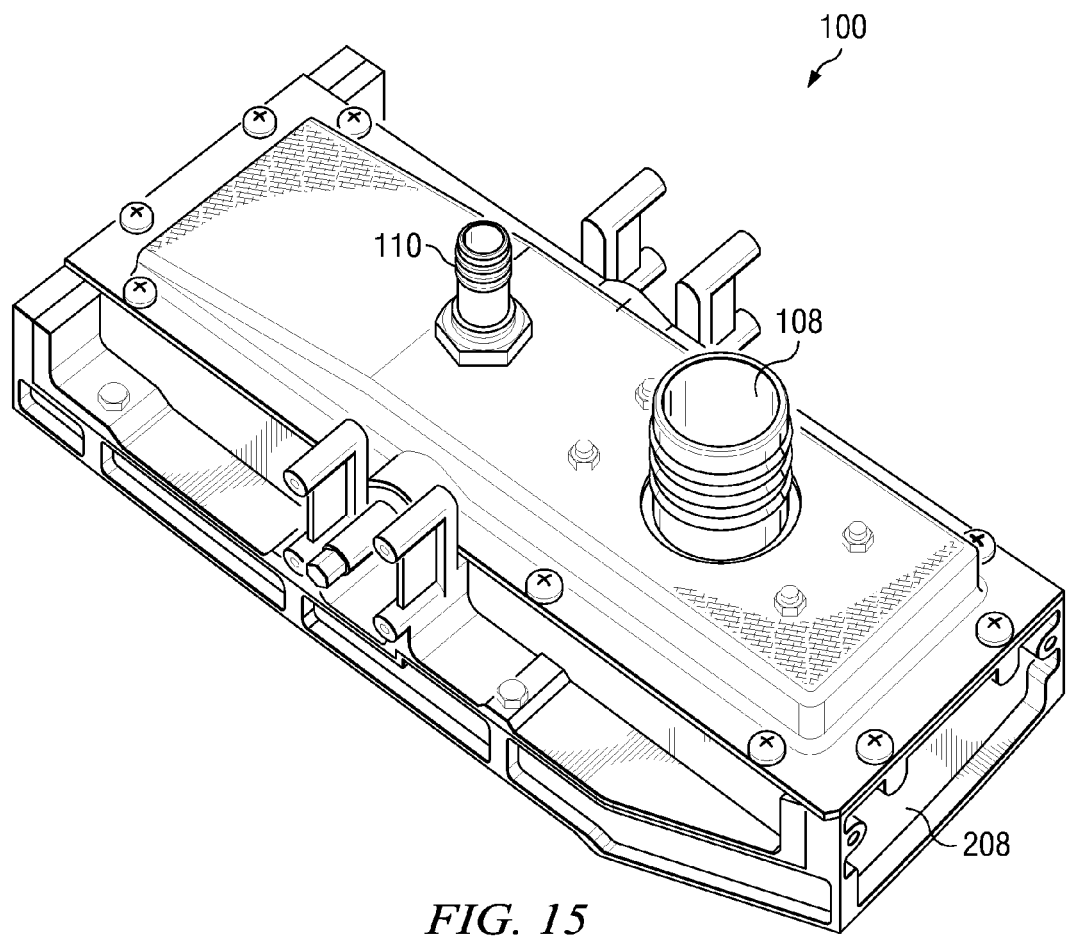
FIG. 15 is a left front quarter bottom perspective view of the mechanism.

Referring now to the drawings, wherein like reference numbers are used herein to designate like elements throughout, the various views and embodiments of a computer activiated gas cap. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIGS. 1-16, various views are provided of a computer activated automatic gas cap mechanism 100 in accordance with a first embodiment. FIGS. 1-6 illustrate the mechanism 100 from the top with the filler compartment door 102 in the closed position and the gas cap 104 sealed. FIGS. 7-10 illustrate the mechanism 100 from the top with the filler compartment door 102 in the open position and the gas cap 104 open, exposing the filler tube neck 106. FIGS. 11-15 illustrate the mechanism 100 from the bottom, showing the filler tube bottom 108 and the overflow drain 110. The elements and operation of the gas cap mechanism 100 are described in detail in connection with the description of the remaining figures, wherein like elements have like reference numbers.

Figure 17:
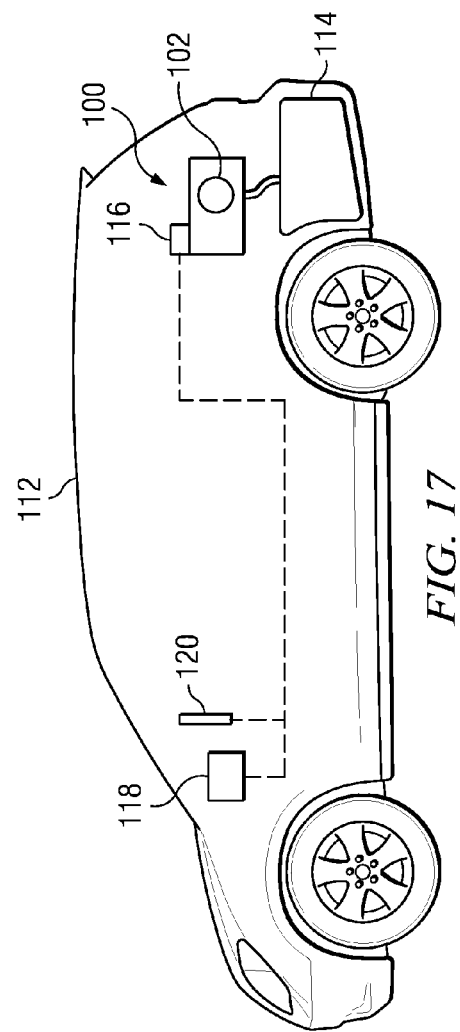
FIG. 17 is a schematic view of the mechanism of FIG. 1 installed in a vehicle with a onboard computer.

Referring now to FIG. 17, the mechanism 100 may be installed in a vehicle 112 near the fuel tank 114. An electric drive motor 116 or other actuator is controlled by a computer 118 located within the vehicle 112. Operation of the mechanism 100 may be initiated through the use of a touch screen 120 or other I/O device. To begin fueling, the computer activates the drive motor 116 in a first direction, causing the filler compartment door 102 to retract into the filler compartment. As the filler compartment door 102 is retracting, the gas cap 104 is pulled away from the filler tube neck 106 and held open to allow the fuel nozzle to be inserted. After fueling is complete, the computer 118 activates the drive motor 116 in the opposite direction to reverse the process. The computer can sense when the vehicle begins moving, and never forgets to close the fuel door.

Referring now to FIGS. 16a-16m, there is illustrated a computer activated automatic gas cap mechanism 200 in accordance with an alternative embodiment. The components and mechanical operation of mechanism 200 are substantially similar to that of mechanism 100, except that a different style actuator is used to produce linear motion. The FIGS. 16a-16m show the step-by-step motion of the mechanism for the complete opening cycle.

Referring first to FIG. 16a, the mechanism 200 is shown installed in a vehicle body 202 in a first, fully closed configuration. The filler compartment door 204 is closed, i.e., pressed against the opening 206 of mechanism housing 208 (shown in phantom). The gas cap 210 is sealed against the filler tube neck 212. The compartment door 204 is supported on door support link 214, which has a front link roller 216 at its front end and a rear link pivot 218 at its rear end. Front link roller 216 rides in a slot 220 running lengthwise down the side of the housing 208. The rear pivot link 218 is also connected to the upper arm 222 of the split bellcrank 224, which rotates about axle 226. The lower arm 228 of the split bellcrank 224 is connected at actuator pivot 230 to the end of a telescoping linear actuator 232. A slack link 234 has a bar member 236 jointed to a loop member 238. The bar member 236 is connected to a top pivot 240 on the gas cap 210 and the loop member 238 passes between the two halves of the split bellcrank 224 and encircles the axle 226. When the mechanism 200 is in the fully closed configuration, the axle 226 is disposed at the front end of the loop member 238.

Referring next to FIG. 16b, when the computer initiates the opening cycle of the mechanism 200, the linear actuator 232 begins to retract toward actuator motor 242 in the direction shown by arrow 244. This motion causes the split bellcrank 224 to rotate around the axle 226 in the direction shown by arrow 246. This, in turn, causes the rear link pivot 218 to move in the direction shown by arrow 248. Motion of the rear link pivot 218 causes the rear end of door support link 214 to drop, withdrawing the rear end of the filler compartment door 204 from the opening 206 as indicated by arrow 250.

Referring next to FIGS. 16c-16e, as the actuator 232 continues to retract, the split bellcrank 224 continues to rotate and the rear end of the filler compartment door 204 continues to drop as indicated by arrow 252 until it clears the inner lip of the opening 206 as shown in FIG. 16e.

Figure 16G:
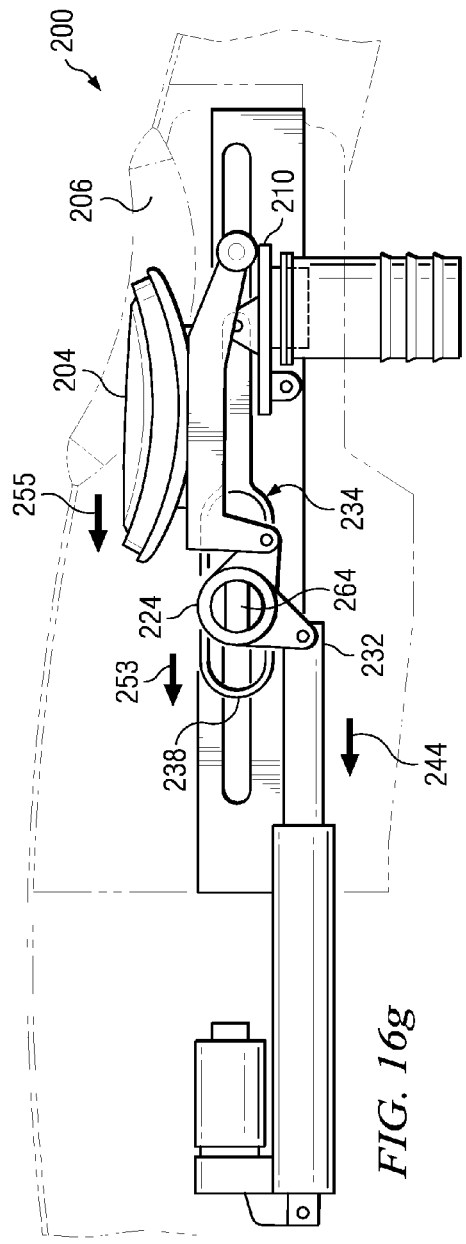
Figure 16H:
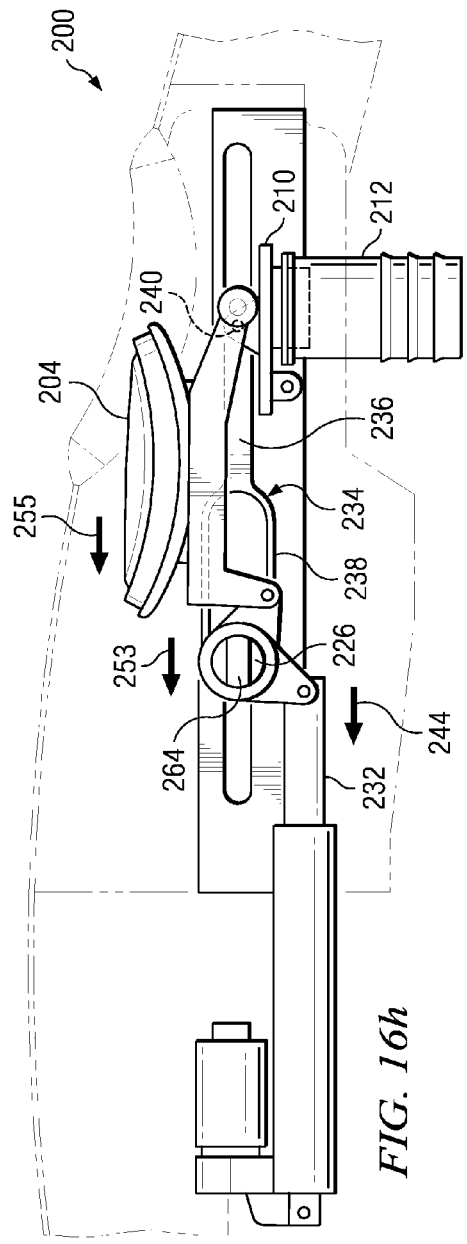

Referring next to FIGS. 16f-16g, once the door 204 has cleared the opening 206, the bellcrank 224 stops rotating and is retracted by the actuator 232 as indicated by arrow 253 along with the axle 226. Since the axle 226 is inside the loop member 238 of slack link 234, movement of the axle causes rearward movement of the door 204 as indicated by arrow 255, but does not cause movement of the slack link, and the gas cap 210 remains sealed.

Figure 16M:
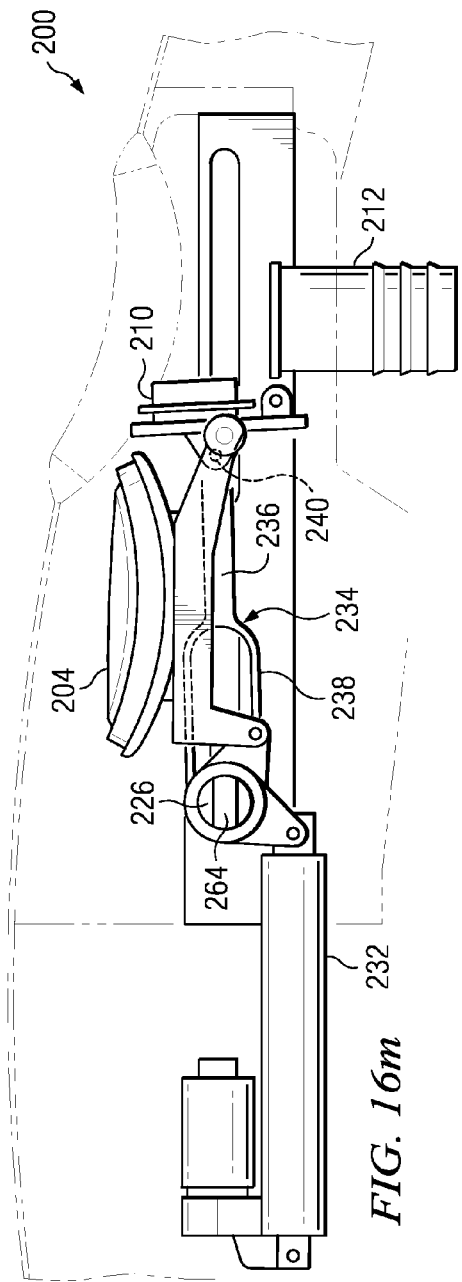

Referring next to FIGS. 16h-16m, once the axle 226 reaches the end of the loop member 238, it begins pulling slack member 234 in the direction of the actuator 232 as indicated by arrow 244. The bar member 236 then begins pulling the top pivot 240 of the gas cap 210, causing it to rotate in the direction indicated by arrow 257 and unseal from the filler neck 212. This motion continues until the gas cap 210 is fully raised as shown in FIG. 16m and the filler neck 212 is exposed. These steps are reversed during the close cycle.

Figure 18:
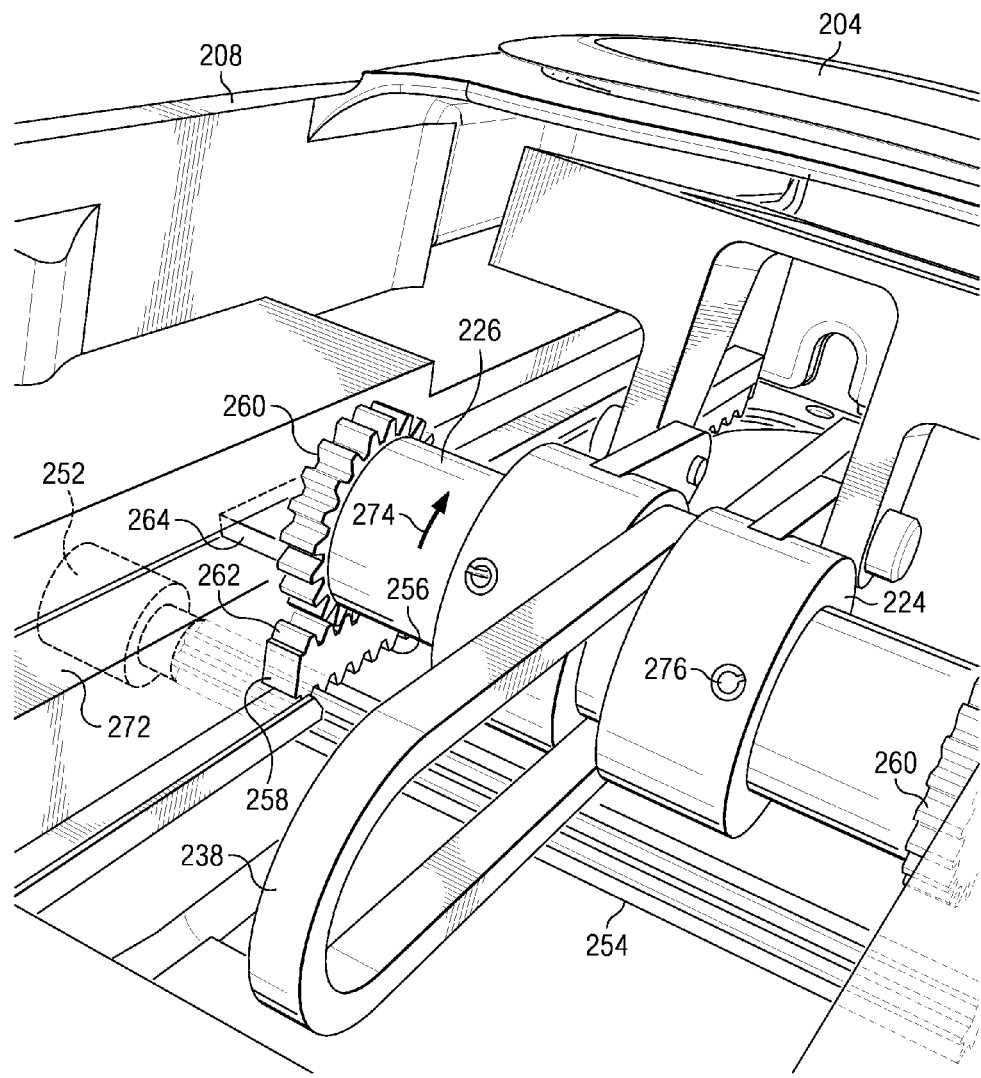
FIG. 18 is a partial perspective view further illustrating the drive mechanism for the automatic gas cap of FIGS. 1-15.
Figure 20:
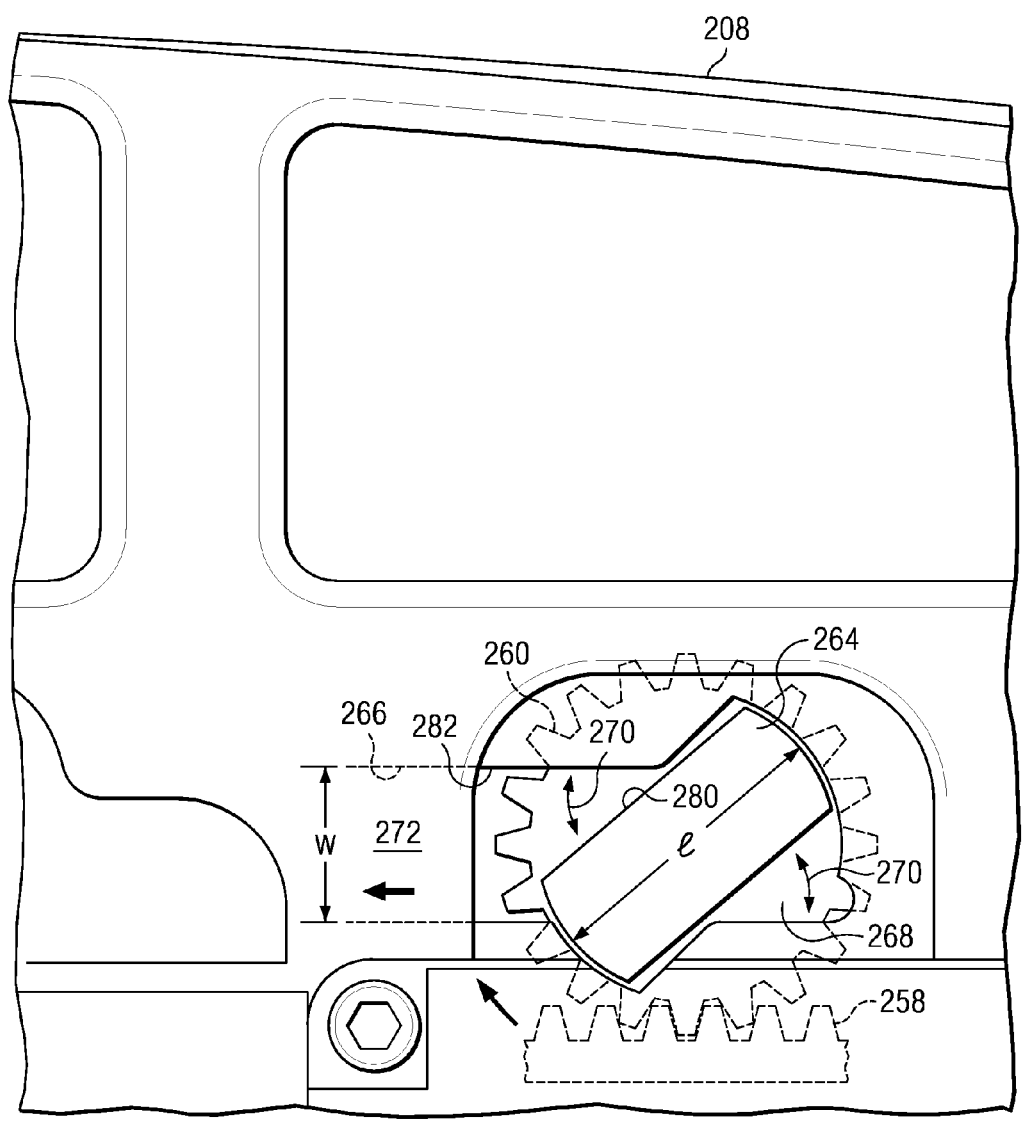
FIG. 20 is a partial side view of the drive mechanism of FIGS. 1-15 further illustrating the mechanism.

FIG. 18 is a partial perspective view illustrating an alternative drive mechanism for the automatic gas cap and FIG. 20 is a partial side view of the drive mechanism of FIG. 18. Referring first to FIG. 18, the drive mechanism may be powered with an electric motor 252 that may be mounted on the outside of housing 208. Motor 252 drives a geared pinion shaft 254, which in turn engages first sides 256 of a pair of racks 258 (one shown). A pair of drive gears 260 mounted on, or integrally formed with axle 226 engage the second sides 262 of racks 258.

Figure 19:
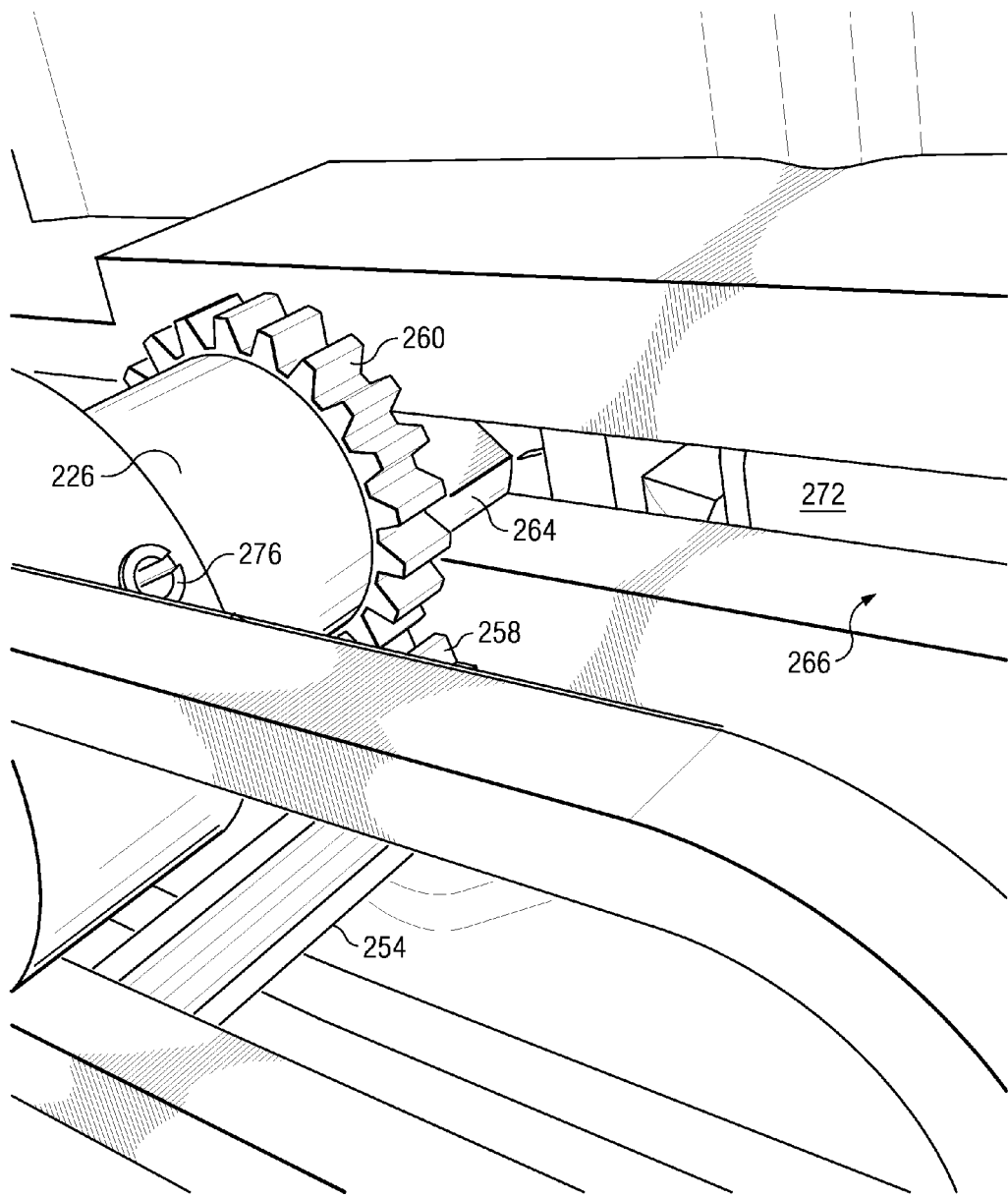
FIG. 19 is a partial perspective view of the drive mechanism of FIGS. 1-15.

FIG. 19 is an opposing partial perspective view and FIG. 20 is a partial side view further illustrating the drive mechanism of FIG. 18. As illustrated, the ends of axle 226 are formed in the shape of generally rectangular end cam members 264. Cam members 264 are in turn are mounted in slots 266 formed in interior surfaces of housing 208. End portions 268 (FIG. 20) of slots 266 are enlarged and configured such that cam members 264 may rotate in the enlarged end portions of the slots as indicated by arrows 270 (FIG. 20). The portions 272 of slots 226 extending from end portions 268 have a width w less than the width l of the longer sectional axis of cam members 264 such that the cam member cannot rotate when positioned in portions 272 of slots 266.

Referring to FIGS. 19 and 20, when motor 252 is initially actuated under the control of computer 118 (FIG. 17) or another vehicle control switch, the motor drives geared pinion shaft 254 which in turn drives racks 258. Racks 258 drive gears 260 to rotate axle 226 turning cam members 264 in enlarged end portions 268 of slots 266 until the longer sectional axis l of the cam members are aligned substantially parallel with the portions 272 of the slots. As axle 226 rotates, split bell crank 224 rotates with the axle in the direction shown by arrow 274, opening the filler compartment door 204 as previously described in connection with FIGS. 16s-16e. In the illustrated embodiment, split bell crank 224 is secured on axle 226 with roll pins 276.

When the longer sectional axis l of the cam members 264 move into alignment with the narrow portions 272 of slots 266 a surface 280 of the cam members contacts a wall 282 of the slot, constraining the cam members from further rotation. Thus, as racks 258 are driven further, cam members 264 slide longitudinally in a linear direction in narrow portions 272 of slots 266, carrying axle 226 to the end of the end of the loop member 238. As racks 258 continue to move, the gas cap 210 (FIG. 16a) is raised and opened as described in connection with FIGS. 16h-16m. As will be appreciated, to close the gas cap 210 and filler compartment door 204, motor 252 is actuated to drive racks 258 in the reverse direction.

It will be appreciated by those skilled in the art having the benefit of this disclosure that this computer activiated gas cap provides a gas cap mechanism that automatically opens the door to the fuel filler compartment and the gas cap itself allows "hands-free" refueling. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An automated gas cap mechanism for opening and closing the fuel tank of a vehicle comprising:
    a housing;
    a filler compartment door;
    a door support link, the filler compartment door being mounted on the door support link;
    an axle mounted in the housing, wherein the axle is configured to rotate and move longitudinally in the housing, the axle having first and second ends mounted in slots formed in the housing;
    a crank mounted on the axle, the crank having an arm pivotally coupled to the door support link;
    a gas cap coupled to the axle; and
    a drive motor coupled to the axle;
    wherein the drive motor rotates the axle and crank to retract the filler compartment door into the housing and wherein the drive motor drives the axle in a linear direction to open the gas cap.

2. The automated gas cap mechanism of claim 1 wherein the drive motor is coupled to the axle with a linear actuator connected to a second arm of the crank.

3. The automated gas cap mechanism of claim 1 further comprising a pinion and rack and wherein the drive motor is coupled to the axle with the pinion and rack.

4. The automated gas cap mechanism of claim 3 further comprising at least one drive gear mount on the axle, the drive gear engaging the rack to rotate the axle and to move the axle in a linear direction.

5. The automated gas cap mechanism of claim 1 further comprising a loop member for coupling the gas cap to the axle.

6. The automated gas cap mechanism of claim 5 wherein the crank comprises a split bell crank and wherein the loop member is positioned on the axle between the two halves of the bell crank.

7. The automated gas cap mechanism of claim 1 wherein the door support link further comprises a front link roller configured to translate in a lengthwise slot formed in a side of the housing.

8. The automated gas cap mechanism of claim 1 further comprising a computer for controlling the mechanism.

9. A computer actuated gas cap mechanism for opening and closing the fuel tank of a vehicle comprising:
    an onboard computer for controlling the operation of the mechanism;
    a drive motor for driving the mechanism, the mechanism further including:
    a housing including a plurality of slots formed in inside surfaces of the housing;
    an axle mounted in the housing and coupled to the drive motor, the axle having first and second ends mounted in opposed ones of the slots and wherein the axle is configured to rotate and move linearly along the slots;
    a filler compartment door;
    a door support link coupled to the drive motor, the filler compartment door being mounted on the door support link;
    a bell crank mounted on the axle, the bell crank having an arm pivotally connected to the door support link;
    a gas cap coupled to the axle; and
    wherein the drive motor is operable to rotate the axle and bell crank to retract the filler compartment door into the housing and to drive the axle in a linear direction along the slots to open the gas cap.

10. The automated gas cap mechanism of claim 9 wherein the drive motor is coupled to the axle with a linear actuator pivotally connected to a second arm of the bell crank.

11. The automated gas cap mechanism of claim 9 further comprising a pinion and rack and wherein the drive motor is coupled to the axle with the pinion and rack.

12. The automated gas cap mechanism of claim 11 further comprising at least one drive gear mounted on the axle, the drive gear engaging the rack to rotate the axle and to move the axle in a linear direction when the motor is actuated.

13. The automated gas cap mechanism of claim 9 further comprising a loop member for coupling the gas cap to the axle and wherein linear movement of the axle in a first direction causes the gas cap to pivot open and wherein linear movement of the axle in a second direction causes the gas cap to pivot to a closed position.

14. The automated gas cap mechanism of claim 13 wherein the bell crank comprises a split bell crank and wherein the loop member is positioned around the axle between the two halves of the split bell crank.

15. A computer actuated gas cap mechanism for opening and closing the fuel tank of a vehicle comprising:
- a drive motor for driving the mechanism, the mechanism including:
  - a housing including opposed slots formed in inside surfaces of the housing, the slots each having an enlarged portion at one end thereof and a narrow portion extending from the enlarged portion;
  - an axle mounted in the housing and coupled to the drive motor, the axle having first and second end cams mounted in opposed ones of the slots and wherein the axle is configured to rotate when the end cams are positioned in the enlarged end portions of the slots and move in a linear direction along when the end cams are positioned in the narrow portions of the slots;
  - a filler compartment door;
  - a door support link coupled to the drive motor, the filler compartment door being mounted on the door support link;
  - a bell crank mounted on the axle, the bell crank having an arm pivotally connected to the door support link;
  - a gas cap coupled to the axle; and
  - wherein the drive motor is operable to rotate the axle and bell crank to retract the filler compartment door into the housing and to drive the axle in a linear direction along the slots to open the gas cap.

16. The automated gas cap mechanism of claim 15 further comprising:
- a pinion and rack coupled to the drive motor;
- a drive gear mounted on the axle, the drive gear engaging the rack to rotate the axle and move the axle in a linear direction along the slots when the drive motor is actuated.

17. The automated gas cap mechanism of claim 15 further comprising a loop member for coupling the gas cap to the axle.

18. The automated gas cap mechanism of claim 17 further comprising a slack link for connecting the loop member to the gas cap.

19. The automated gas cap mechanism of claim 17 wherein the crank comprises a split bell crank and wherein the loop member is positioned on the axle between the two halves of the bell crank.

20. The automated gas cap mechanism of claim 15 wherein the door support link further comprises a front link roller configured to translate in a slot formed lengthwise in a side of the housing.

* * * * *